Figure 1:
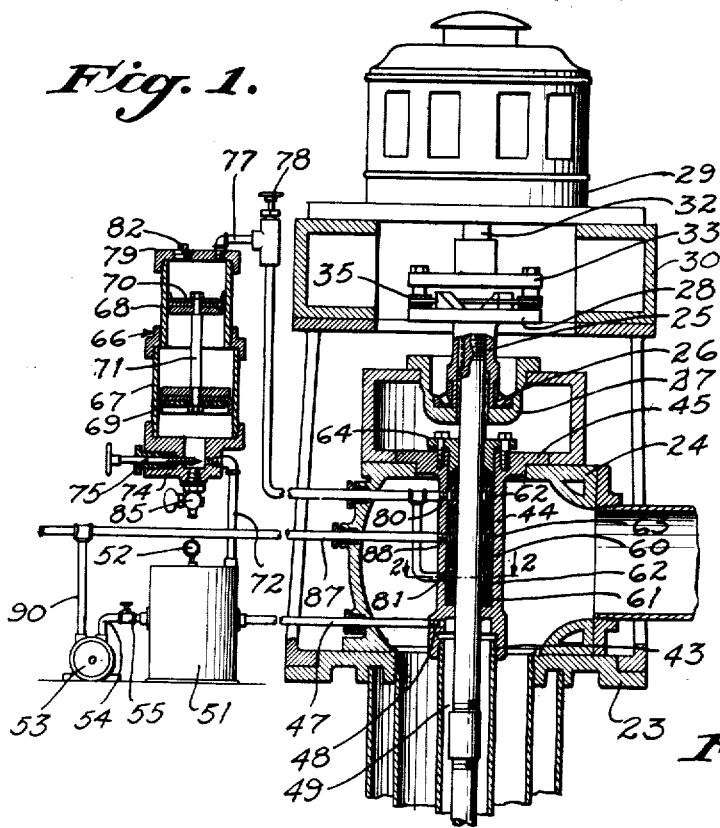

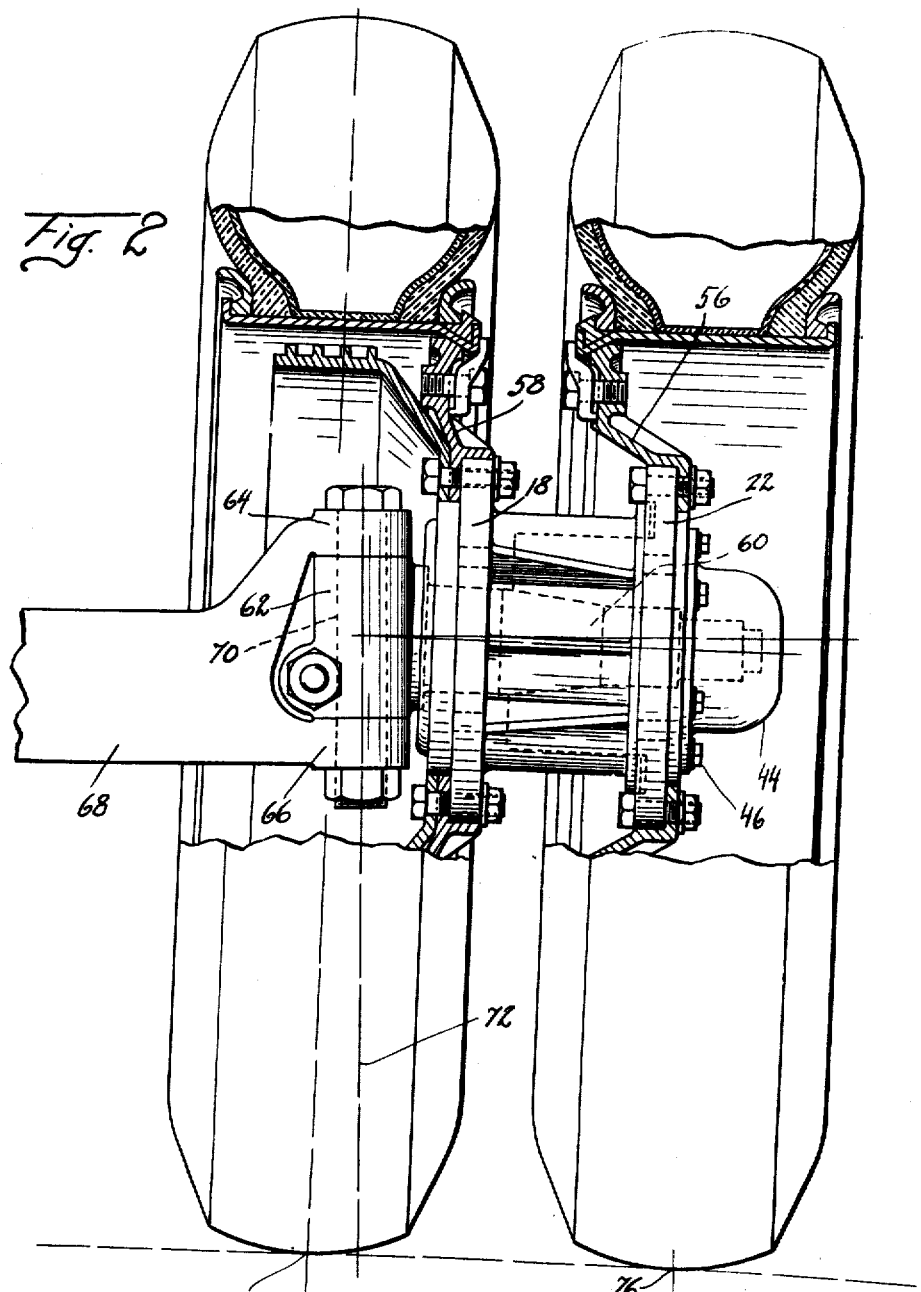

Patented June 9, 1931

1,809,699

UNITED STATES PATENT OFFICE

JAMES F. HIGBEE, OF DETROIT, MICHIGAN, ASSIGNOR OF ONE-HALF TO STEPHEN A. GRIGGS, OF DETROIT, MICHIGAN

DUAL WHEEL ASSEMBLY

Application filed January 7, 1929. Serial No. 330,768.

My invention relates to vehicle supporting dual wheel assemblies and has particular reference to a type particularly adaptable for use on trailer vehicles.

The use of pneumatic tires upon dual wheel assemblies has entailed much unnecessary wear and tear on the tire fabric, and an object of my invention is to eliminate such wear.

Hitherto it has been customary to mount each of the wheels of the dual assembly for rotation as an integral unit about the axle, or supporting spindle. Due to the fact that modern roads present a pronounced crown at the center thereof with a decided slope toward each side, the load carried by the trailer, and the weight of the trailer itself, is primarily absorbed by the two inner sets of tires on each of the dual assemblies. This results in a pronounced depression of the inner tire at that portion which engages the road and a consequent decrease in the effective turning radius of the wheel. Due to this decreased radius there is a tendency for the inner wheel of each dual assembly to rotate more rapidly than its outer wheel, the effective turning radius of the outer wheel remaining substantially constant inasmuch as by far the lesser proportion of the load is carried thereby.

While the difference in the effective turning radius of the inner and outer wheels of such a dual assembly by virtue of the above fact may seem negligible, experiment has disclosed the fact that there is a decided tendency for the more rapidly rotating inner wheel to drag with it the lagging outer wheel and thus create slippage of the outer tire upon the road surface with each rotation of the inner wheel. This slippage would be of no consequence for a few short hauls, but when hundreds of miles are traversed daily, experiment has shown that there is a slippage of the outer tire surface over the road equivalent to a drag of several miles. Obviously such dragging of a tire over the road surface day after day will wear the fabric of the tire rapidly.

This difficulty also exists when dual wheel assemblies are rounding turns, at such time the turning radius of the inner tire being somewhat less than that of the outer tire and consequently tending to cause more rapid rotation of the outer tire than the inner with attendant slippage.

I propose to eliminate this difficulty entirely by mounting each of the wheels of such a dual assembly for independent rotation about its supporting axis. Furthermore, a subsidiary object of my invention is to so design the wheel hubs and the supporting bearings for each hub that the former are readily demountable and the latter may be tightened upon removal of the conventional hub cap only.

A further object of my invention is to incorporate with the supporting bearings for the hubs a bearing intermediate the two hub supporting bearings to take the end thrust from each of the wheels. I have so designed the entire bearing assembly and cooperating supporting parts that all three bearing sets may be tightened as a unit in the maner above indicated.

Still another object of my invention is to arrange such a dual wheel assembly as indicated above so that it may be mounted upon a swivelled front wheel spindle, permitting the swivelled axis, or king pin, to lie intermediate the road engaging surface of the tire carried by each of the wheels. In this way I eliminate drag when the wheels rotate at different speeds as the dual assembly is turned about its swivelled axis for the purpose of steering the vehicle.

Figure 2:
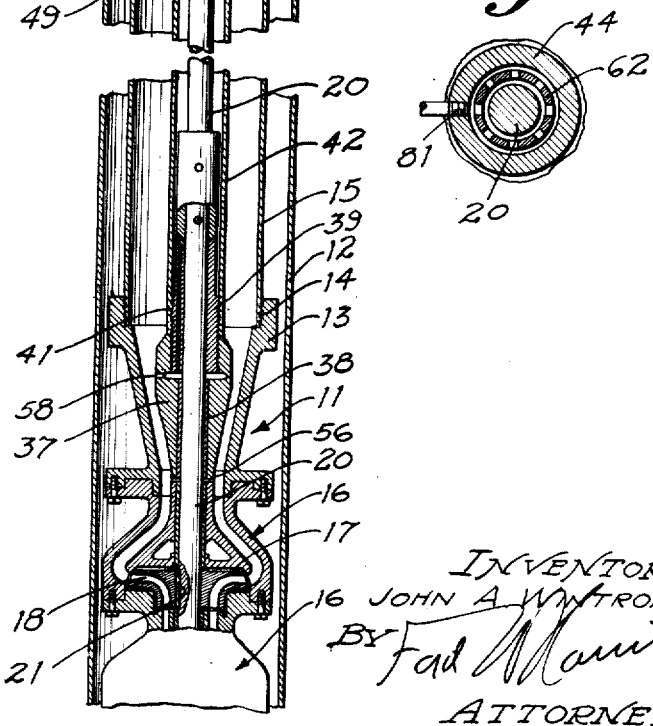

Various other objects and meritorious features of my invention will be apparent from the following description, taken in conjunction with the drawings, wherein like numerals refer to like parts throughout the several figures and wherein:

Fig. 1 is a transverse elevation, partly in in section, of my improved wheel assembly, and Fig. 2 illustrates more clearly the wheel assembly mounted on a swivelled spindle.

Referring to the drawings, the wheel supporting spindle 60 which is provided with an inner bearing surface 14 and an outer bearing surface 16, the inner bearing surface radial flanges about the outer periphery of each of said hubs.

5. A dual wheel assembly comprising, in combination, a spindle, a pair of transversely spaced apart rotary bearings mounted upon said spindle, a thrust bearing intermediate said rotary bearings, and an inner and an outer wheel hub journalled upon said transverse bearings and having overlapped portions.

6. A dual wheel assembly comprising, in combination, a spindle, a wheel hub mounted thereon, a second wheel hub journalled thereon for rotation independently of the first hub and having a portion overlapping a portion of the first hub, and a bearing intermediate the extremities of the hub assembly for taking the axial thrust of each hub.

In testimony whereof, I, JAMES F. HIGBEE sign this specification.

JAMES F. HIGBEE.

June 16, 1931. J. A. WINTROATH 1,810,333
HIGH PRESSURE PUMP HEAD
Filed Sept. 7, 1926

INVENTOR:
JOHN A. WINTROATH,
BY Fad Manis
ATTORNEY.

radial flanges about the outer periphery of each of said hubs.

5. A dual wheel assembly comprising, in combination, a spindle, a pair of transversely spaced apart rotary bearings mounted upon said spindle, a thrust bearing intermediate said rotary bearings, and an inner and an outer wheel hub journalled upon said transverse bearings and having overlapped portions.

6. A dual wheel assembly comprising, in combination, a spindle, a wheel hub mounted thereon, a second wheel hub journalled thereon for rotation independently of the first hub and having a portion overlapping a portion of the first hub, and a bearing intermediate the extremities of the hub assembly for taking the axial thrust of each hub.

In testimony whereof, I, JAMES F. HIGBEE sign this specification.

JAMES F. HIGBEE.

CERTIFICATE OF CORRECTION.

Patent No. 1,809,699.      Granted June 9, 1931, to

JAMES F. HIGBEE.

It is hereby certified that error appears in the above numbered patent requiring correction as follows: In the heading to the printed specification, line 5, date of filing application for "January 7, 1929. Serial No. 330,768" read September 18, 1930. Serial No. 482,688; and that the said Letters Patent should be read with this correction therein that the same may conform to the record of the case in the Patent Office.

Signed and sealed this 18th day of August, A. D. 1931.

(Seal)
M. J. Moore,
Acting Commissioner of Patents.

CERTIFICATE OF CORRECTION.

Patent No. 1,809,699.                                                    Granted June 9, 1931, to

JAMES F. HIGBEE.

It is hereby certified that error appears in the above numbered patent requiring correction as follows: In the heading to the printed specification, line 5, date of filing application for "January 7, 1929. Serial No. 330,768" read September 18, 1930. Serial No. 482,688; and that the said Letters Patent should be read with this correction therein that the same may conform to the record of the case in the Patent Office.

Signed and sealed this 18th day of August, A. D. 1931.

(Seal)                                                              M. J. Moore,
                                                                      Acting Commissioner of Patents.